United States Patent
Kitamura

(10) Patent No.: US 11,343,217 B2
(45) Date of Patent: May 24, 2022

(54) COMMUNICATION SYSTEM AND COMMUNICATION METHOD

(71) Applicant: Murata Machinery, Ltd., Kyoto (JP)

(72) Inventor: Wataru Kitamura, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 112 days.

(21) Appl. No.: 16/644,711

(22) PCT Filed: Jul. 23, 2018

(86) PCT No.: PCT/JP2018/027428
§ 371 (c)(1),
(2) Date: Mar. 5, 2020

(87) PCT Pub. No.: WO2019/049528
PCT Pub. Date: Mar. 14, 2019

(65) Prior Publication Data
US 2020/0296069 A1 Sep. 17, 2020

(30) Foreign Application Priority Data
Sep. 7, 2017 (JP) .............................. JP2017-171988

(51) Int. Cl.
*H04L 51/226* (2022.01)
*H04L 1/22* (2006.01)
(Continued)

(52) U.S. Cl.
CPC ................ *H04L 51/26* (2013.01); *H04L 1/22* (2013.01); *H04L 47/2433* (2013.01);
(Continued)

(58) Field of Classification Search
CPC ....... H04L 51/26; H04L 1/22; H04L 47/2433; H04L 51/24; H04L 51/38; H04W 4/12
See application file for complete search history.

(56) References Cited

U.S. PATENT DOCUMENTS 6,725,419 B1 * 4/2004 Barthel .............. G05B 19/4185
714/807
7,813,271 B2 10/2010 Fourcand
(Continued)

FOREIGN PATENT DOCUMENTS

| JP | 4-81141 | 3/1992 |
| JP | 9-312659 | 12/1997 |

(Continued)

OTHER PUBLICATIONS

Notification of Reason for Refusal dated Apr. 27, 2021, of counterpart of KR 10-2020-7006229, with English translation.

*Primary Examiner* — Patrice L Winder
*Assistant Examiner* — Aye M Aung
(74) *Attorney, Agent, or Firm* — DLA Piper LLP (US)

(57) ABSTRACT

A communication system includes a transmission-side processing device, and a reception-side processing device, the transmission-side processing device and the reception-side processing device communicate using a plurality of communication lines, wherein the transmission-side processing device concurrently transmits the same telegraphic messages via each of the plurality of communication lines, and the reception-side processing device is capable of concurrently receiving telegraphic messages via each of the plurality of communication lines, and when a same telegraphic message as a previously received telegraphic message is received later, invalidates the same telegraphic message received later while processing the previously received telegraphic message.

12 Claims, 11 Drawing Sheets

(51) Int. Cl.
*H04L 47/2425* (2022.01)
*H04L 51/224* (2022.01)
*H04L 51/58* (2022.01)
*H04W 4/12* (2009.01)

(52) U.S. Cl.
CPC .............. *H04L 51/24* (2013.01); *H04L 51/38* (2013.01); *H04W 4/12* (2013.01)

(56) References Cited

U.S. PATENT DOCUMENTS

| | | | |
|---|---|---|---|
| 2010/0138573 A1 | 6/2010 | Sano et al. | |
| 2011/0118903 A1* | 5/2011 | Kraimer | G05D 1/0016 701/2 |
| 2013/0212260 A1* | 8/2013 | Zeitune | H04L 41/50 709/224 |
| 2014/0314401 A1 | 10/2014 | Fujimori | |
| 2018/0107577 A1* | 4/2018 | Johnsson | G06F 11/3428 |
| 2018/0299880 A1* | 10/2018 | Takashima | G06Q 50/28 |

FOREIGN PATENT DOCUMENTS

| | | | | |
|---|---|---|---|---|
| JP | 11-205352 A | | 7/1999 | |
| JP | 2001-230800 A | | 8/2001 | |
| JP | 2001230800 A | * | 8/2001 | |
| JP | 2006-109301 | | 4/2006 | |
| JP | 2009-44583 | | 2/2009 | |
| JP | 2010-118970 | | 5/2010 | |
| JP | 2010-129018 | | 6/2010 | |
| JP | 2014-212407 A | | 11/2014 | |
| JP | 2016-15035 | | 1/2016 | |
| WO | 2008/128447 A1 | | 10/2008 | |
| WO | WO-2008128447 A1 | * | 10/2008 | .......... H04L 1/0086 |
| WO | WO-2017200569 A1 | * | 11/2017 | .......... G06F 3/0481 |

\* cited by examiner

COMMUNICATION SYSTEM AND COMMUNICATION METHOD

TECHNICAL FIELD

This disclosure relates to a communication system and a communication method.

BACKGROUND

As a communication system, there is known a technique in which a transmission-side processing device and a reception-side processing device communicate using a plurality of communication lines (for example, see Japanese Unexamined Patent Application, First Publication No. H9-312659). Japanese Unexamined Patent Application, First Publication No. H9-312659 discloses a technique such that in the communication system, the transmission-side processing device transmits same telegraphic messages via a main communication line and a sub communication line, and when an anomaly is detected in the main communication line serving as a telegraphic message receiving line, the telegraphic message receiving line is switched from the main communication line to the sub communication line.

In the communication system of Japanese Unexamined Patent Application, First Publication No. H9-312659, the same telegraphic messages are transmitted via the main communication line and the sub communication line. However, on the reception side, the telegraphic messages can only be received via one of these two communication lines selected by a reception switching circuit. Therefore, if an anomaly occurs in one of the communication lines (the main communication line), there is a problem that it is necessary to switch over to the other communication line (the sub communication line) and this switching takes time. Consequently, processing of the received telegraphic messages takes time on the reception side, resulting in delays in operations required on the reception side.

It could therefore be helpful to provide a communication system and a communication method capable of suppressing the occurrence of a delay in an operation required on the reception side while realizing redundancy of a communication system.

SUMMARY

I thus provide:

A communication system comprising a transmission-side processing device, and a reception-side processing device, the transmission-side processing device and the reception-side processing device communicating using a plurality of communication lines, wherein the transmission-side processing device concurrently transmits the same telegraphic messages via each of the plurality of communication lines, and wherein the reception-side processing device is capable of concurrently receiving telegraphic messages via each of the plurality of communication lines, and when a same telegraphic message as a previously received telegraphic message is received later, invalidates the same telegraphic message received later while processing the previously received telegraphic message.

At least one of the transmission-side processing device and the reception-side processing device may be provided on a moving body. The transmission-side processing device may transmit one telegraphic message having identification information assigned thereto concurrently via each of the plurality of communication lines, and the reception-side processing device may identify whether or not the later received telegraphic message is the same as the previously received telegraphic message, based on the identification information of the plurality of telegraphic messages received via each of the plurality of communication lines. When, among a plurality of telegraphic messages received within a preliminarily set specific period, a same telegraphic message as a previously received telegraphic message is received later, the reception-side processing device may invalidate the same telegraphic message received later.

The transmission-side processing device may include a priority determiner which determines a priority of a telegraphic message to be transmitted and may transmit the telegraphic message via the plurality of communication lines or one of the communication lines according to the priority determined by the priority determiner. The reception-side processing device may be provided in a transport vehicle which transports an article, the transmission-side processing device may be provided in a controller which controls the transport vehicle, and the priority determiner may determine that the priority is high if a telegraphic message contains an instruction which causes the transport vehicle to execute a predetermined operation, and may determine that the priority is low if the telegraphic message does not contain the instruction. The transmission-side processing device may concurrently transmit same telegraphic messages via each of the plurality of communication lines if the priority determiner determines that the priority is high, and may transmit the telegraphic message via one of the communication lines if the priority determiner determines that the priority is low.

A communication method in which the transmission-side processing device and the reception-side processing device communicate using a plurality of communication lines, the communication method comprising: having the transmission-side processing device concurrently transmit same telegraphic messages via each of the plurality of communication lines; and having the reception-side processing device receive telegraphic messages concurrently via each of the plurality of communication lines and, when a same telegraphic message as a previously received telegraphic message is received later, invalidate the same telegraphic message received later while processing the previously received telegraphic message.

The above summary does not enumerate all necessary features of my method and system, and sub-combinations of the features may also be incorporated and embodied as part of this disclosure.

According to my communication system and communication method, the transmission-side processing device concurrently transmits the same telegraphic messages via each of the plurality of communication lines, and the reception-side processing device is capable of concurrently receiving telegraphic messages via each of the plurality of communication lines, and when a same telegraphic message as a previously received telegraphic message is received later, invalidates the same telegraphic message received later while processing the previously received telegraphic message. As a result, even when the reception-side processing device receives several same telegraphic messages, it is still possible to avoid redundant execution of the telegraphic message content. Even if an anomaly occurs in any of the plurality of communication lines, the reception-side processing device still receives a telegraphic message via another communication line with no anomaly occurring therein. Therefore, it is possible to realize communication redundancy and avoid delays in telegraphic message transmission. With this configuration, early processing of telegraphic messages is made possible, and this enables early execution of operations required on the reception side and suppresses delays in the operations.

In the communication system in which at least one of the transmission-side processing device and the reception-side processing device is provided on a moving body, although communication anomalies are likely to occur as the moving body moves, early processing of telegraphic messages is possible in the moving body even when an anomaly occurs in any of the communication lines. In the communication system in which the transmission-side processing device concurrently transmits one telegraphic message having identification information assigned thereto via each of the plurality of communication lines, and the reception-side processing device identifies whether or not the later received telegraphic message is the same as the previously received telegraphic message, based on the identification information of the plurality of telegraphic messages received via each of the plurality of communication lines, it is easy to identify, based on the identification information assigned to the telegraphic messages, whether or not the later received telegraphic message is the same as the previously received telegraphic message. In the communication system in which when, among several telegraphic messages received within a specific period, a same telegraphic message as a previously received telegraphic message is received later, the reception-side processing device invalidates the same telegraphic message received later, it is determined whether or not those telegraphic messages are the same telegraphic messages within the specific period and, therefore, processing of telegraphic messages can be performed early without taking the unnecessary waiting time to receive several telegraphic messages.

In the communication system in which the transmission-side processing device includes a priority determiner which determines the priority of a telegraphic message to be transmitted, and transmits the telegraphic message via the plurality of communication lines or one of the communication lines according to the priority determined by the priority determiner, it is possible to suppress an unnecessary increase in the load imposed on the communication lines, the transmission-side processing device, and the reception-side processing device. In the communication system in which the reception-side processing device is provided in a transport vehicle which transports an article, the transmission-side processing device is provided in a controller which controls the transport vehicle, and the priority determiner determines that the priority is high if a telegraphic message contains an instruction which causes the transport vehicle to execute a predetermined operation, and determines that the priority is low if the telegraphic message does not contain the instruction, a high priority is given to a telegraphic message containing an instruction which causes the transport vehicle to execute a predetermined operation and, therefore, priority determination can be performed easily. In the communication system in which the transmission-side processing device concurrently transmits the same telegraphic messages via each of the plurality of communication lines if the priority determiner determines that the priority is high, and transmits the telegraphic message via one of the communication lines if the priority determiner determines that the priority is low, communication redundancy can be realized by concurrently transmitting the same telegraphic messages via each of the plurality of communication lines when a high priority is given, and the load imposed on the transmission-side processing device and the reception-side processing device can be suppressed by transmitting the telegraphic message via one of the communication lines when a low priority is given.

DETAILED DESCRIPTION

Description of Reference Signs

Figure 4:
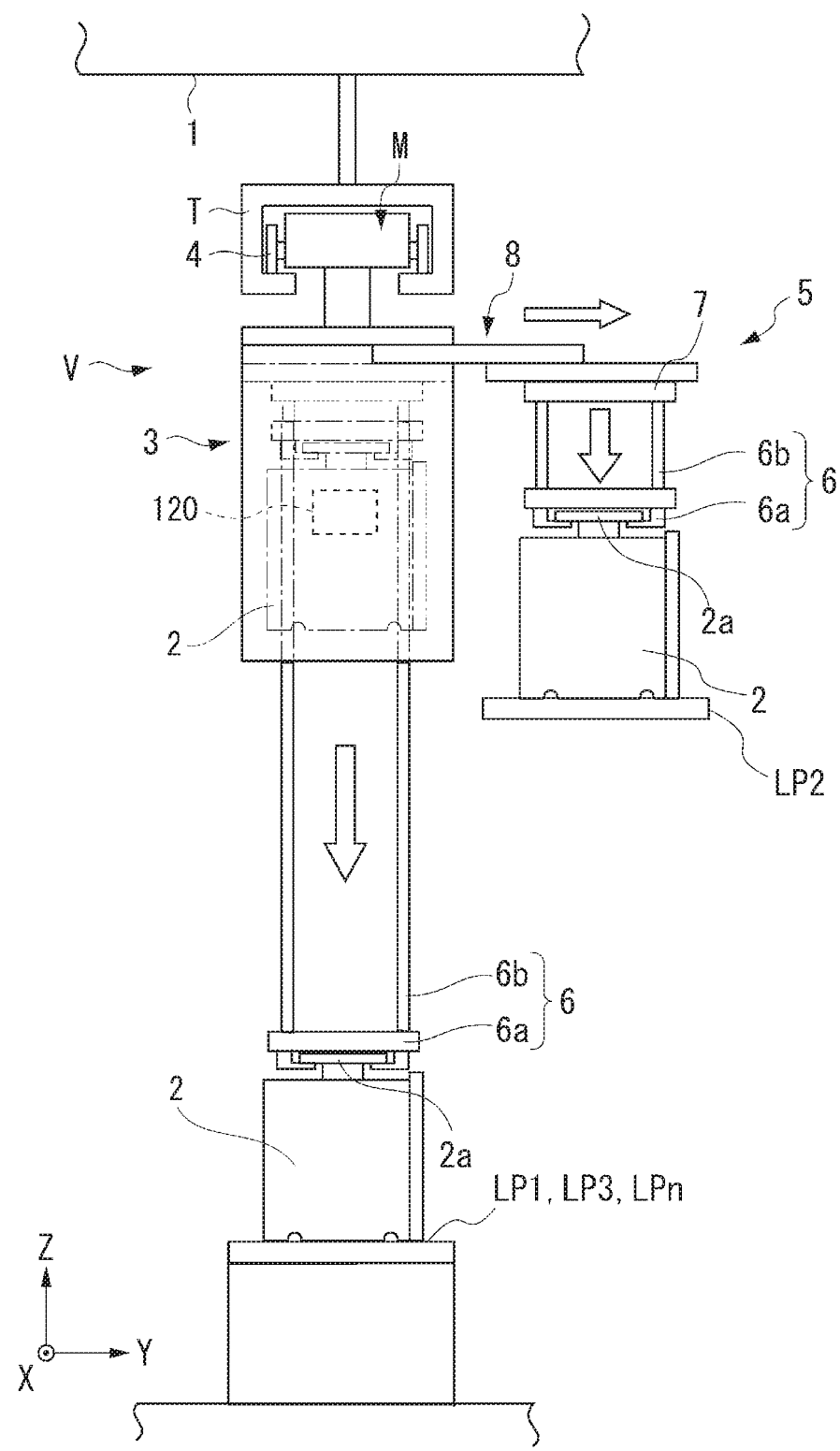
FIG. 4 is a diagram showing an example of the transport vehicle.
Figure 5:
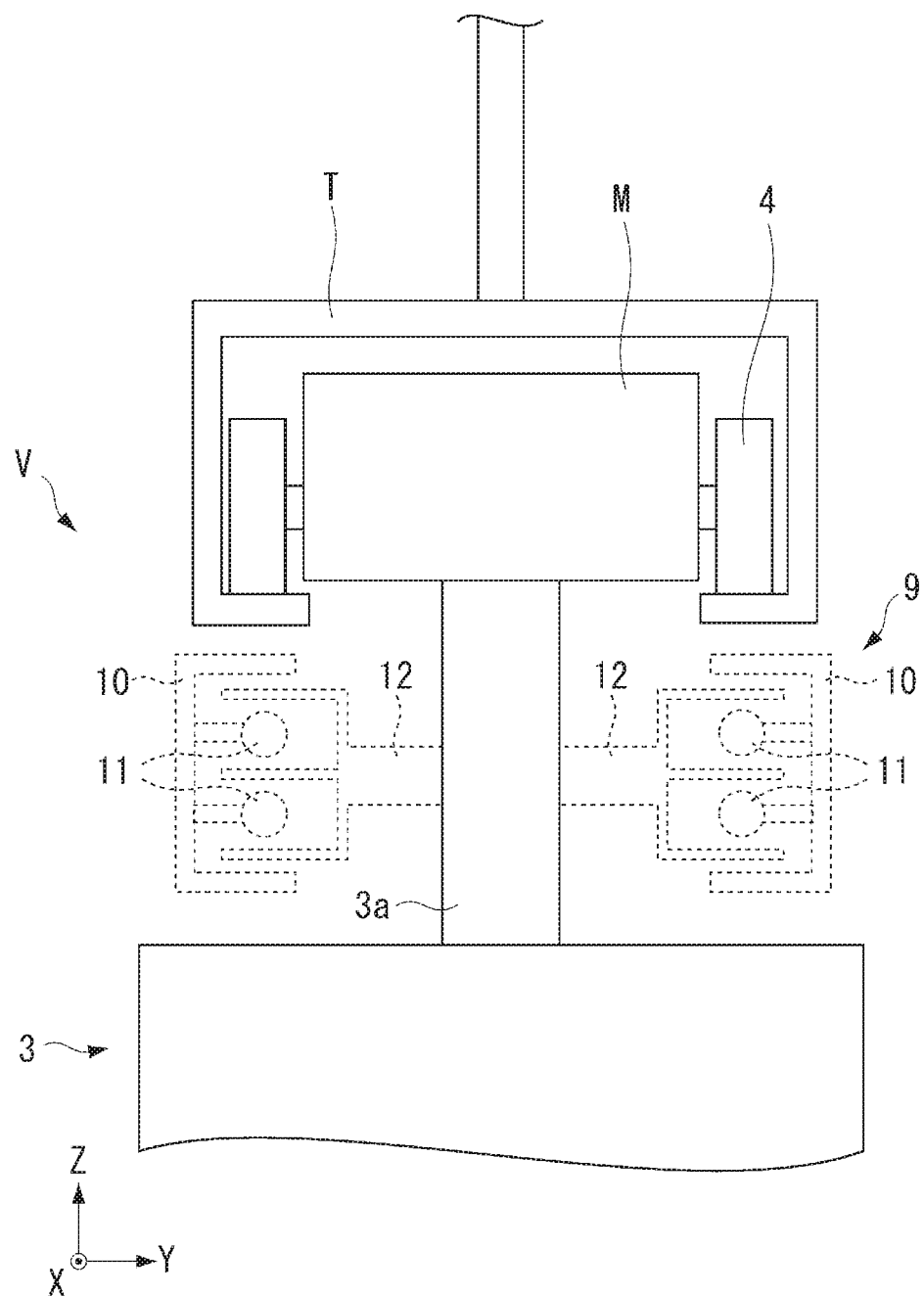
FIG. 5 is a diagram showing an enlarged view of a part of the transport vehicle.

C Controller
SYS Transport system
V Transport vehicle
1A First communication line
1B Second communication line
2 Article
100 Communication system
110 Transmission-side processing device
111 Transmitter
112 Priority determiner
113 Transmission-side processor
114 Priority setter
120 Reception-side processing device
121 Receiver
122 Period setter
123 Telegraphic message determiner
124 Statistics logger
125 Reception-side processor The following describes an example with reference to the drawings. However, this disclosure is not limited to the example. In the drawings, scale is changed as necessary to illustrate the example such as by enlarging or by emphasizing a part. In FIGS. 4 and 5, an XYZ coordinate system is used to describe directions in the figures. In the XYZ coordinate system, a plane that is parallel to a horizontal plane is defined as an XY plane. In this XY plane, a traveling direction of a transport vehicle V is denoted as an X direction and a direction orthogonal to the X direction is denoted as a Y direction. A direction perpendicular to the XY plane is denoted as a Z direction. For each of the X direction, the Y direction, and the Z direction, description is made with a definition in which a direction indicated by an arrow is the positive (+) direction and a direction opposite to the direction indicated by the arrow is the negative (−) direction.

Figure 1:
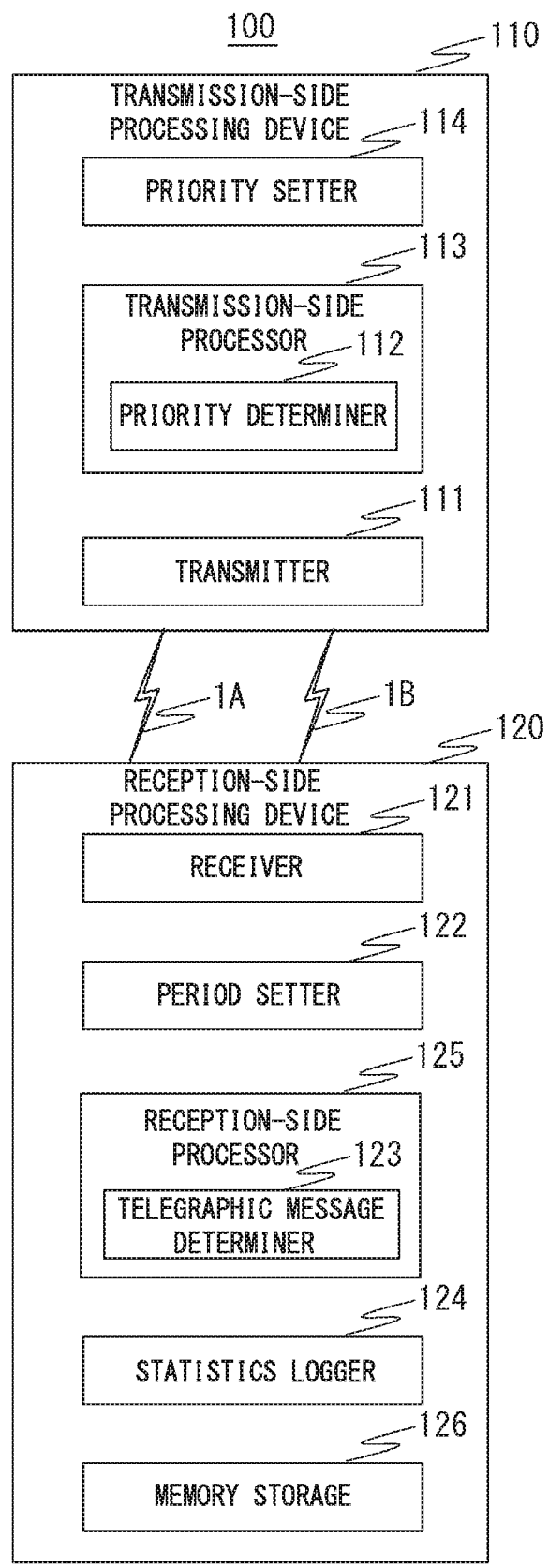
FIG. 1 is a diagram showing an example of a communication system.
Figure 2:
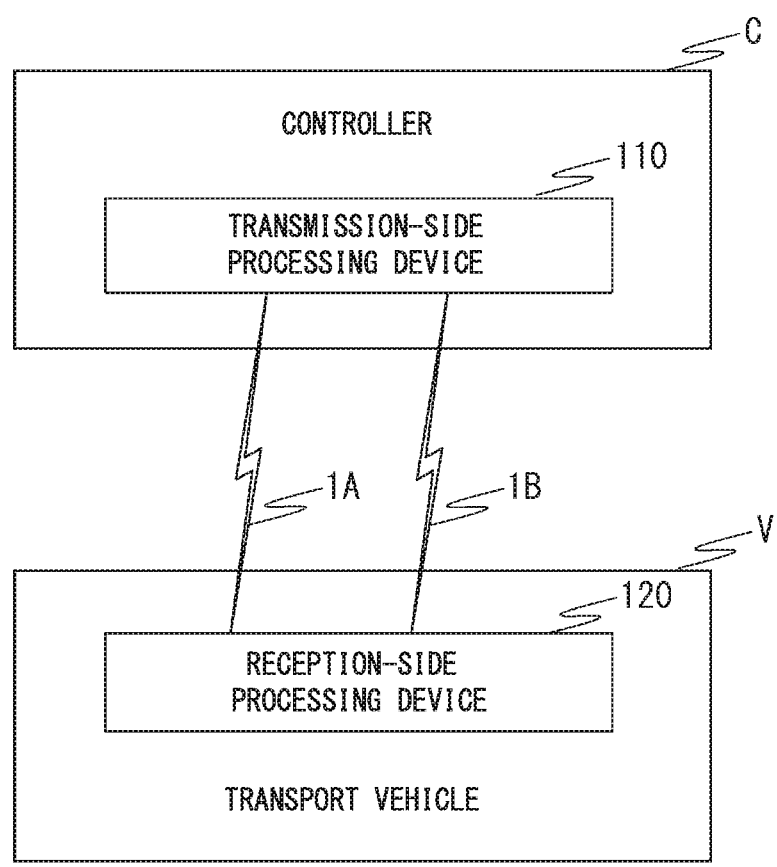
FIG. 2 is a diagram showing an example in which the communication system is applied to a transport vehicle serving as a moving body and to a controller.

FIG. 1 is a diagram showing an example of a communication system 100. FIG. 2 is a diagram showing an example in which the communication system 100 is applied to the transport vehicle V serving as a moving body and to a controller C. As shown in FIGS. 1 and 2, the communication system 100 is a system providing communication via two communication lines, namely, a first communication line 1A and a second communication line 1B. This example describes when the two communication lines are used as a plurality of communication lines. However, the number of the communication lines is not limited to two and may be three or more. For example, two lines of wireless LAN (Local Area Network) are used for the two communication lines, that is, the first communication line 1A and the second communication line 1B. A wireless LAN is a local area communication network through which data are transmitted or received wirelessly.

Further, the communication system 100 is not limited to a configuration in which wireless LANs are used as communication lines. For example, other wireless communication lines such as Bluetooth (registered trademark) may be used, or feeder communication which uses feeder lines or the like may be used. The feeder communication will be described later. Moreover, communication may be performed using wired communication lines, or communication may be performed using both a wireless communication line and a wired communication line.

The communication system 100 includes a transmission-side processing device 110 and a reception-side processing device 120. The transmission-side processing device 110 transmits telegraphic messages via the first communication line 1A and the second communication line 1B respectively. The reception-side processing device 120 receives telegraphic messages via the first communication line 1A and the second communication line 1B respectively. A telegraphic message here means a set of data described in accordance with a certain format and transmitted or received between the transmission-side processing device 110 and the reception-side processing device 120. This data can be created, for example, by the transmission-side processing device 110 and processed by the reception-side processing device 120.

As shown in FIG. 2, the reception-side processing device 120 is provided in a transport vehicle V that transports an article. The transport vehicle V will be described in detail later. The reception-side processing device 120 is composed of, for example, an electronic circuit or the like and controls various operations of the transport vehicle V. A control device that controls various operations of the transport vehicle V may be configured separately from the reception-side processing device 120.

As shown in FIG. 2, the transmission-side processing device 110 is provided in a controller C that controls the transport vehicle V. For example, the controller C is a host controller which is installed on the ground side and controls the transport vehicle V. The transmission-side processing device 110 controls a plurality of the vehicles V in an integrated manner A controller that controls the plurality of transport vehicles V in an integrated manner may be configured separately from the transmission-side processing device 110.

As shown in FIG. 1, the transmission-side processing device 110 includes a transmitter 111, a priority determiner 112, a transmission-side processor 113, and a priority setter 114. According to a determination result of the priority determiner 112, upon instruction from the transmission-side processor 113, the transmitter 111 concurrently transmits same telegraphic messages via two lines, the first communication line 1A and the second communication line 1B respectively, or transmits a telegraphic message only via one of the first communication line 1A and the second communication line 1B.

The priority determiner 112 is included in the transmission-side processor 113 described later, and according to the priority set by the priority setter 114 described later, determines whether to concurrently transmit telegraphic messages via the two lines, the first communication line 1A and the second communication line 1B respectively or to transmit a telegraphic message only via one of the first communication line 1A and the second communication line 1B, and generates data showing this determination result. Whether or not the priority determiner 112 is provided is arbitrary. For example, the priority determiner 112 need not be provided. In such an example, the transmitter 111 concurrently transmits the same telegraphic messages both via the two lines, the first communication line 1A and the second communication line 1B, respectively.

The transmission-side processor 113 generates a telegraphic message (transmission data) to be transmitted to the transport vehicle V according to an instruction from a transport controller not shown in the drawings, for example. The transmission-side processor 113 stores the generated telegraphic message in a memory storage not shown in the drawings. For example, the transmission-side processor 113 adds to the header of the telegraphic message identification information (a sequence number) which is a unique ID corresponding to the content of the telegraphic message. The transmission-side processor 113 determines transmission of the generated transmission data and instructs the transmitter 111.

The priority setter 114 sets a priority for each type of telegraphic message to be transmitted. For example, depending on whether or not the transmission target telegraphic message is a telegraphic message containing an instruction that causes the transport vehicle V to execute a predetermined operation (hereinafter, a telegraphic message containing this instruction is referred to as a specific telegraphic message), the priority setter 114 sets a priority of the telegraphic message. The priority setter 114 sets a high priority in the specific telegraphic message described above and sets a low priority for telegraphic messages other than the specific message. The priority setter 114 can arbitrarily set the priority of a telegraphic message. For example, depending on the operation, the priority of a telegraphic message may be set as a low priority even if the telegraphic message contains the above instruction, or may be set so that a high priority is given even to a telegraphic message which does not contain the above instruction, according to the urgency or the importance thereof. Alternatively, according to the priority of a transported object instructed from a manufacturing controller not shown in the drawings, the priority of the telegraphic message related to the transportation of the transported object may be set. For example, the priority setter 114 may set a transport instruction for transporting a high-priority transported object as a high-priority telegraphic message and may set a transport instruction for transporting a low-priority transported object as a low-priority telegraphic message.

The priority setter 114 stores the set content in a memory storage not shown in the drawings. Among telegraphic messages, the priority setter 114 sets instructions such as a transport instruction and a traveling instruction as high-priority telegraphic messages and sets congestion information and log information as low-priority telegraphic messages. That is to say, in the priority setter 114, whether or not to determine a telegraphic message as being a high-priority telegraphic message (specific telegraphic message) is preliminarily defined according to the telegraphic message type, and the priority setter 114 automatically sets the priority of a telegraphic message according to the definition. Instead of automatically setting the priority, an operator may set the priority by an input device (such as a keyboard and a touch panel) not shown in the drawings. Whether or not the priority setter 114 is provided is arbitrary, and the priority setter 114 need not be provided if the priority determiner 112 is not provided, for example.

As shown in FIG. 1, the reception-side processing device 120 includes a receiver 121, a period setter 122, a telegraphic message determiner 123, a statistics logger 124, a reception-side processor 125, and a memory storage 126. The receiver 121 receives the telegraphic messages (the specific telegraphic messages) concurrently transmitted from the transmitter 111 of the transmission-side processing device 110 via the first communication line 1A and the second communication line 1B, respectively.

The period setter 122 sets a period for identifying whether or not the plurality of telegraphic messages received by the receiver 121 are the same. The period is set by the period setter 122 by an input device (such as a keyboard and a touch panel) not shown in the drawings. The period setter 122 stores the set period in the memory storage 126. Whether or not the period setter 122 is provided is arbitrary, and the period setter 122 need not be provided. In such an example, for the plurality of telegraphic messages received by the receiver 121, it is identified whether or not the telegraphic message received later is the same telegraphic message as the telegraphic message received previously within the predetermined period.

The telegraphic message determiner 123 is provided in the reception-side processor 125, which will be described later, and determines whether or not the telegraphic message received later is the same telegraphic message as the telegraphic message received previously, on the basis of the identification information assigned to the telegraphic messages. This determination is performed on the basis of the identification information stored in the memory storage 126, for example. When the receiver 121 receives a telegraphic message, the reception-side processor 125 stores the identification information assigned to the telegraphic message in the memory storage 126. When the identification information is stored in the memory storage 126, the telegraphic message determiner 123 determines whether or not the identification information assigned to the telegraphic message received by the receiver 121 matches the identification information stored in the memory storage 126, and determines the telegraphic message as being the same telegraphic message as the telegraphic message received previously if the identification information are matched.

The reception-side processor 125 invalidates the later received telegraphic message, which has been determined by the telegraphic message determiner 123 as being the same as the previously received telegraphic message, while processing the previously received telegraphic message. In other words, the reception-side processor 125 ignores the later received telegraphic message, which has been determined as being the same telegraphic message as the previously received telegraphic message. The memory storage 126 may be, for example, a hard disk drive, a flash memory, or the like, and may be built in the reception-side processing device 120 or may be installed outside the reception-side processing device 120.

When the receiver 121 receives telegraphic messages, the statistics logger 124, on the basis of various data transmitted from the reception-side processor 125, stores, in a memory storage not shown in the drawings, whether the telegraphic messages have been transmitted via the first communication line 1A and the second communication line 1B respectively or the telegraphic message has been transmitted only via one of the first communication line 1A and the second communication line 1B. The statistics logger 124 generates statistical information such as usage status in the two communication lines and stores the information in the memory storage. Whether or not the statistics logger 124 is provided is arbitrary, and the statistics logger 124 need not be provided.

Figure 3:
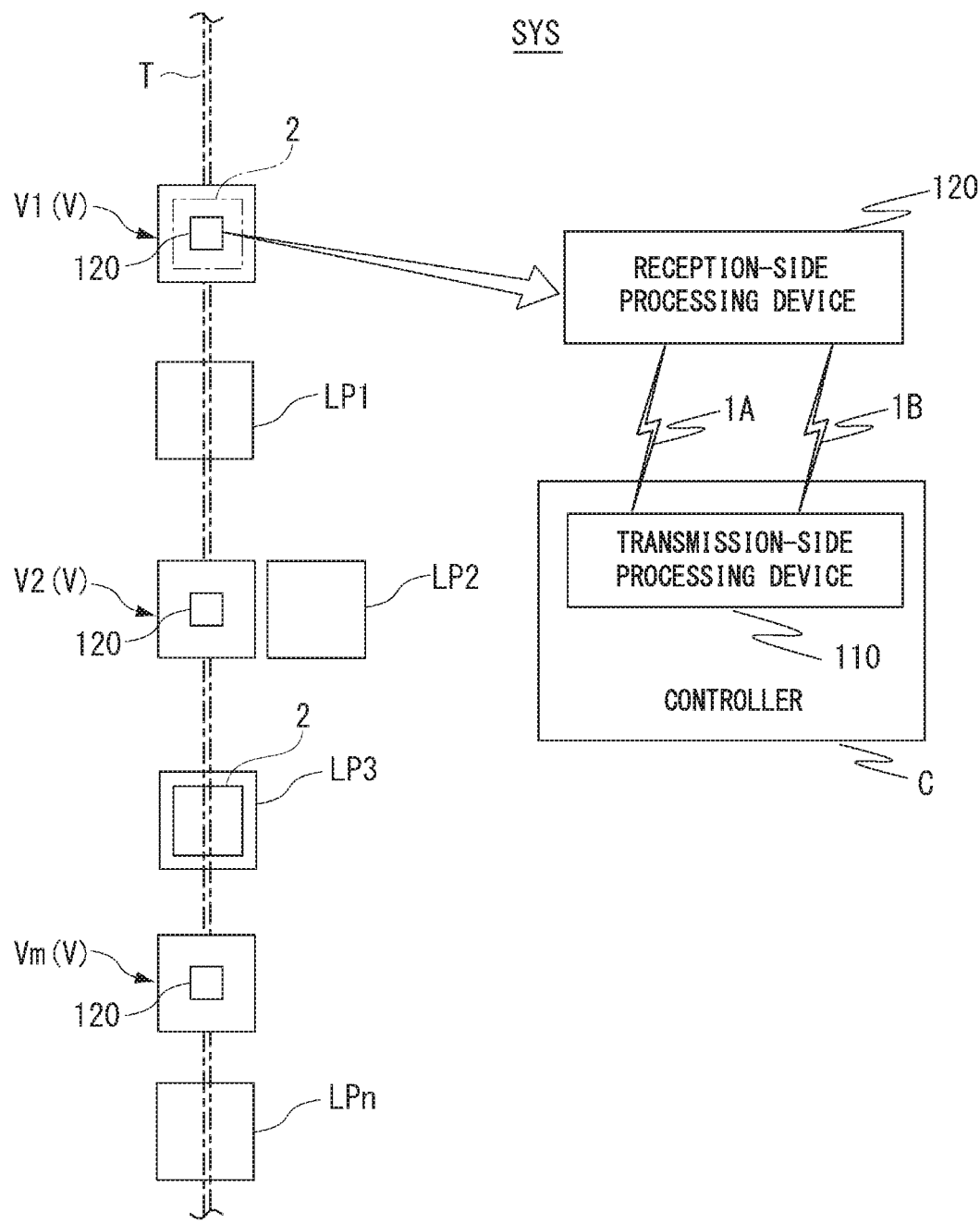
FIG. 3 is a diagram showing an example of a transport system.

FIG. 3 is a diagram showing an example of a transport system SYS to which the above communication system 100 is applied. FIG. 4 is a diagram showing an example of the transport vehicle V. FIG. 5 is a diagram showing an enlarged view of a part of the transport vehicle V. As shown in FIG. 3, the transport system SYS is a system for transporting articles 2. Examples of the article 2 include a FOUP, a SMIF pod, a reticle pod, or the like that accommodate objects such as wafers and reticles. The transport system SYS includes a plurality of transport vehicles V1 to Vm and a plurality of transfer destinations LP1 to LPn.

As shown in FIGS. 3 and 4, the transport vehicles V1 to Vm are overhead transport vehicles that travel along a track T suspended from a ceiling 1 of a building, and receive or deliver the article 2 from or to the plurality of transfer destinations LP1 to LPn arranged below or below and to the side of the track T. In FIG. 3, the transfer destinations LP1, LP3, and LPn are load ports of processing apparatuses arranged below the track T, and the transfer destination LP2 is a storage rack arranged below and to the side of the track T. The number of the transfer destinations LP1 to LPn installed and the arrangement thereof are arbitrary.

The transport vehicles V1 to Vm receive telegraphic messages transmitted from the controller C by the reception-side processing device 120 and perform various operations such as receiving and delivering of the article 2 according to the instructions of the telegraphic messages. As shown in FIG. 4, the transport vehicles V (V1 to Vm) each include a traveler M and a main body 3. The traveler M includes wheels 4 and travels along the track T by a traveling driver not shown in the drawings. The main body 3 is provided in a state of being suspended below the traveler M. The main body 3 includes the reception-side processing device 120 described above, and further includes a transferer 5. The transferer 5 has an article holder 6 which holds the article 2, a lift driver 7 which raises or lowers the article holder 6, and a lateral extender 8 which moves the lift driver 7 in a lateral direction to the track T.

The article holder 6 is, for example, a chuck having movable claws 6a, and inserts the claws 6a under a flange 2a of the article 2 to thereby suspend and hold the article 2. The article holder 6 is connected to suspenders 6b such as wires and belts. The lift driver 7 is, for example, a hoist, and raises or lowers the article holder 6 by taking up or feeding out the suspenders 6b. The lateral extender 8 slides a plurality of movable plates to move the article holder 6 and the lift driver 7 to the lateral side of the track T (in the +Y direction or −Y direction) from the position of being stored in the main body 3. The article holder 6, the lift driver 7, and the lateral extender 8 are controlled by the reception-side processing device 120.

When receiving or delivering the article 2 from or to the transfer destinations LP1, LP3, LPn, the transport vehicle V is stopped in alignment with the transfer destination LP1 and so forth, and receives or delivers the article 2 from or to the transfer destination LP1 and so forth by lowering the article 2 by the lift driver 7. When receiving or delivering the article 2 from or to the transfer destination LP2, the transport vehicle V is stopped in alignment with the transfer destination LP2 and the lift driver 7 is projected in the lateral direction to the track T by the lateral extender 8. Then, the article 2 is received or delivered from or to the transfer destination LP2 by lowering the article holder 6.

As shown in FIG. 5, the transport vehicles V each include power feeders 9. The power feeder 9 includes a power feeding rail 10 and non-contact power supply lines 11 provided along the power feeding rail 10. The power feeders 9 are each arranged below the track T and provided continuously or intermittently along the track T. A power receiver 12 is provided in a connector 3a which connects the traveler M and the main body 3. The power receiver 12 receives electric power in a non-contact manner from the non-contact power supply line 11 and supplies electric power to the traveler M and the main body 3. The reception-side processing device 120 of the main body 3 can perform feeder communication by using a feeder line not shown in the drawings and provided side by side with and separately from the non-contact power supply line 11 or by using the non-contact power supply line 11. In this example, the feeder communication described above can be used for one of the first communication line 1A and the second communication line 1B.

Figure 6:
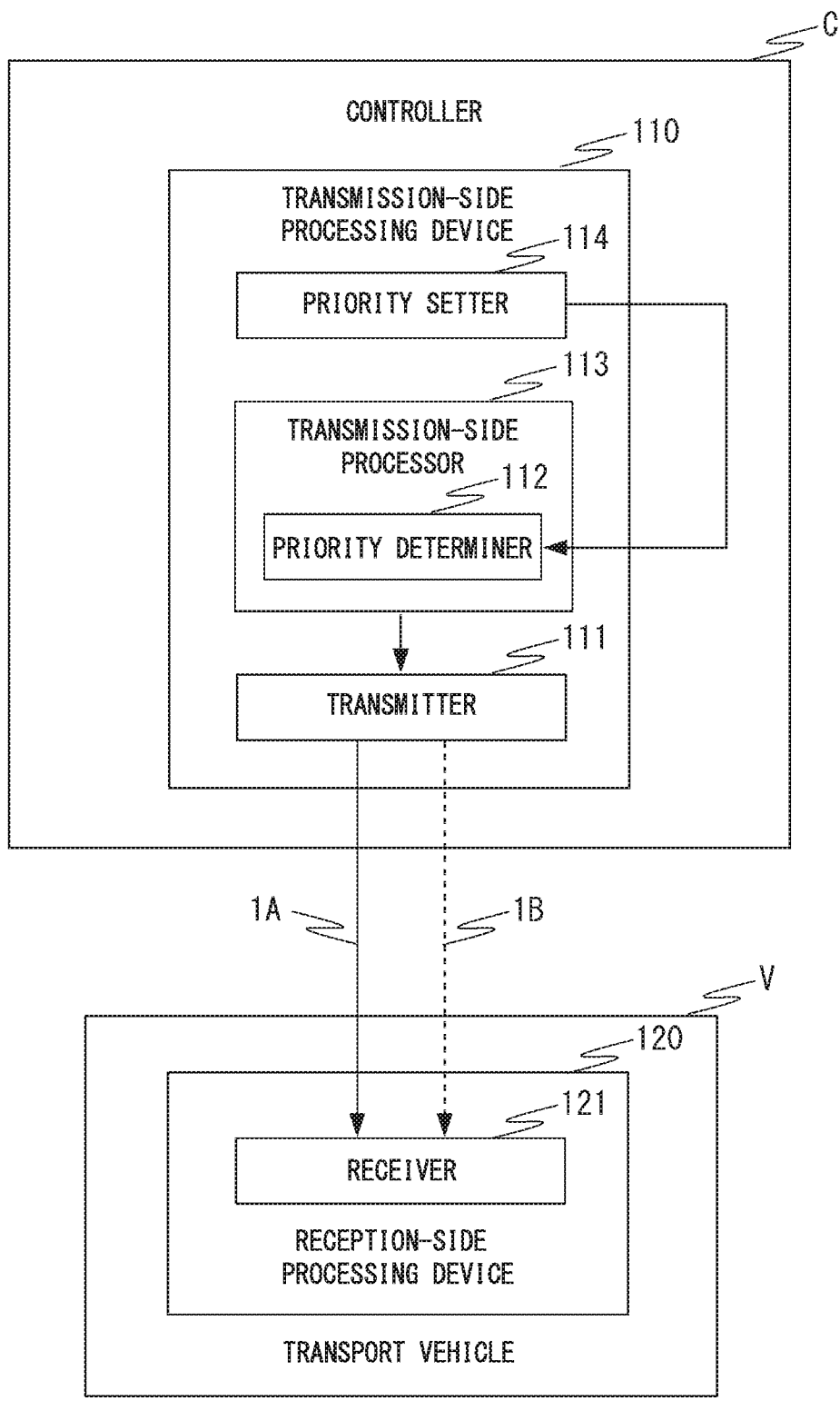
FIG. 6 is a diagram showing an example of a functional block configuration of a transmission-side processing device.
Figure 7:
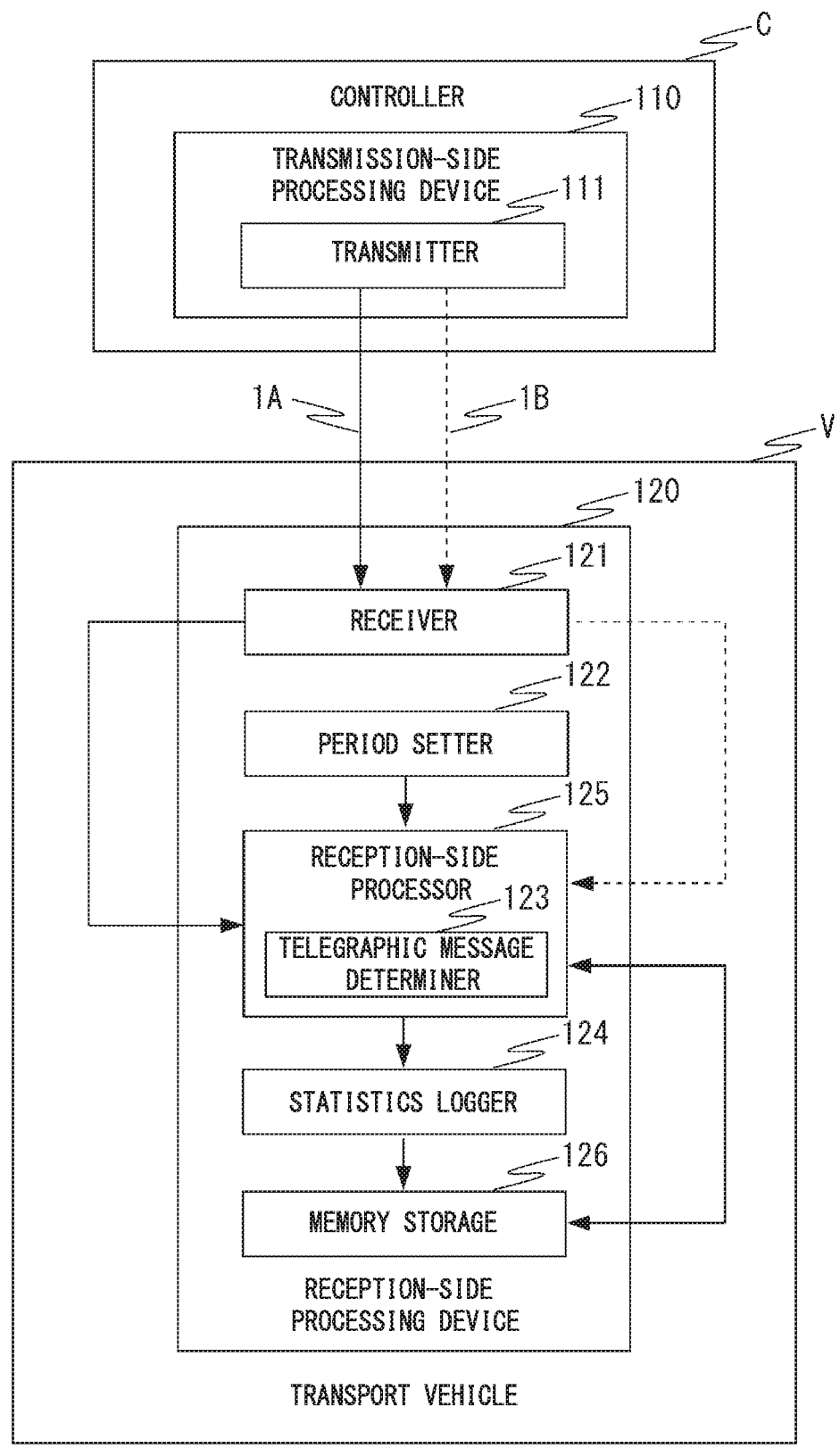
FIG. 7 is a diagram showing an example of a functional block configuration of a reception-side processing device.

FIG. 6 is a diagram which uses functional blocks of the transmission-side processing device 110 to show a data flow example. FIG. 7 is a diagram which uses functional blocks of the reception-side processing device 120 to show a data flow example. Hereinafter, a communication method according to this example is described with reference to FIGS. 6 and 7. In FIGS. 6 and 7, the first communication line 1A is indicated by a solid line and the second communication line 1B is indicated by a dotted line. However, the first communication line 1A is not a main line and the second communication line 1B is not a sub line.

Figure 8:
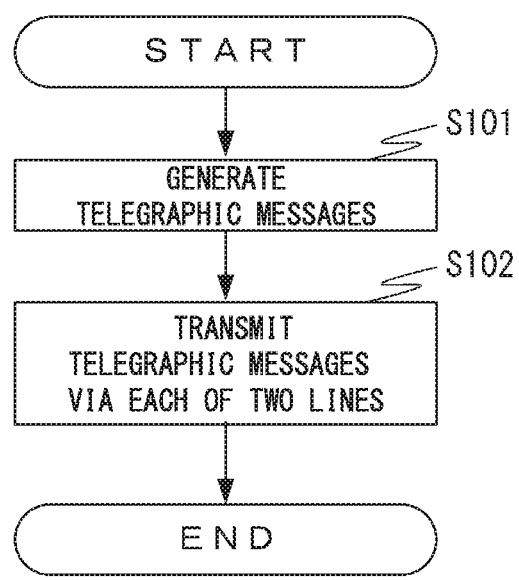
FIG. 8 is a flowchart showing an example of an operation of the transmission-side processing device.

FIG. 8 is a diagram showing an example of an operation flow of the transmission-side processing device 110. In this operation flow there is described an example in which the transmission-side processing device 110 transmits telegraphic messages to the reception-side processing device 120. In the description of this operation flow, the description is made on the basis of FIG. 8, and reference will be made to FIGS. 1, 2, 6, and 7 where appropriate.

In the transmission-side processing device 110, the transmission-side processor 113 generates a telegraphic message to be transmitted to the transport vehicle V (Step S101). The transmission-side processor 113 generates the telegraphic message required to be transmitted to the transport vehicle V on the basis of a preset generation program. The telegraphic messages generated by the transmission-side processor 113 are categorized into specific telegraphic messages which contain an instruction for causing the transport vehicle V to execute a predetermined operation, and telegraphic messages which do not contain this type of instruction. A specific telegraphic message contains, for example, an instruction required to cause the transport vehicle V to perform an operation such as traveling, stopping, and passage permission for a specific point. Examples of a telegraphic message which does not contain this type of instruction include a telegraphic message for querying the state of the transport vehicle V and a telegraphic message containing information which does not require an operation of the transport vehicle V.

The transmission-side processor 113 adds to the header of the telegraphic message identification information, which is an ID unique to the telegraphic message, according to the content of the telegraphic message to be transmitted. The content of the telegraphic message and the identification information to be assigned to the telegraphic message of the content are preliminarily associated with each other and preliminarily stored in a memory storage not shown in the drawings. In accordance with the content of the telegraphic message, the transmission-side processor 113 reads from the memory storage the identification information to be assigned to the content and adds it to the header of the telegraphic message. As shown in FIG. 6, the transmission-side processor 113 transmits the generated telegraphic message to the transmitter 111.

The transmitter 111 receives the transmission target telegraphic message and concurrently transmits the same telegraphic messages via the two lines, the first communication line 1A and the second communication line 1B, respectively (Step S102). In Step S102, the telegraphic messages are respectively transmitted via the first communication line 1A and the second communication line 1B simultaneously or almost simultaneously. However, this disclosure is not limited to this mode, and the same telegraphic messages may be transmitted via the first communication line 1A and the second communication lines 1B respectively with a time difference therebetween.

Figure 9:
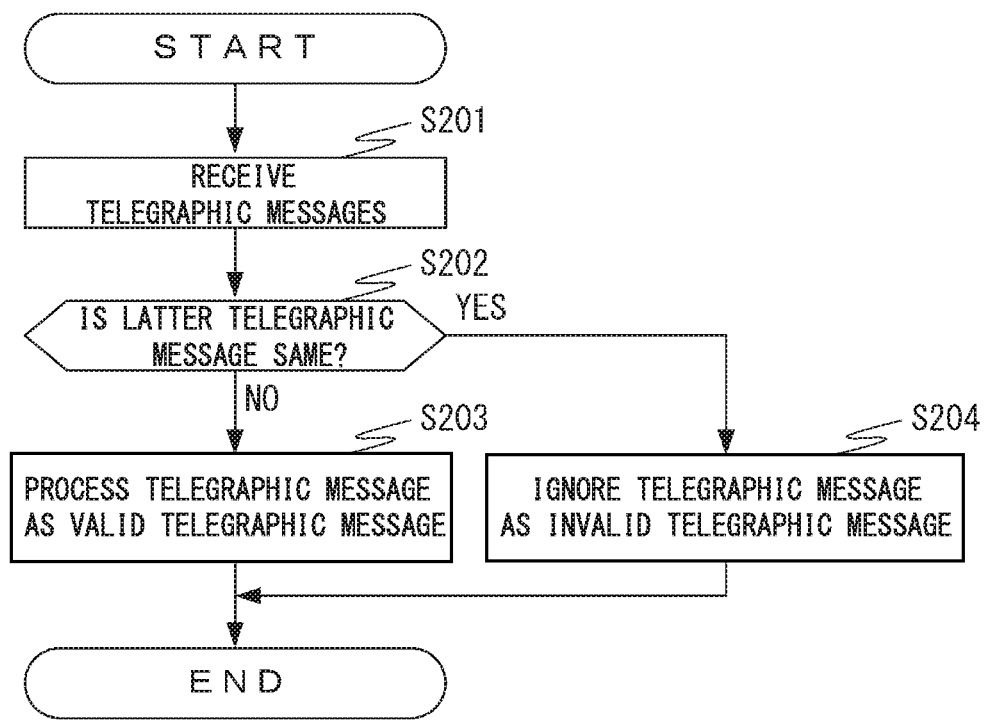
FIG. 9 is a flowchart showing an example of an operation of the reception-side processing device.

FIG. 9 is a diagram showing an example of an operation flow of the reception-side processing device 120. In this operation flow there is described an example in which the reception-side processing device 120 receives telegraphic messages (specific telegraphic messages) transmitted from the transmitter 111. In the description of this operation flow, the description is made on the basis of FIG. 9, and reference will be made to FIGS. 1, 2, 6, and 7 where appropriate.

In the reception-side processing device 120, the receiver 121 receives telegraphic messages transmitted from the transmission-side processing device 110 (Step S201). As shown in FIG. 7, the receiver 121 receives the telegraphic messages transmitted via one or both of the first communication line 1A and the second communication line 1B and transmits the received telegraphic messages to the reception-side processor 125 (the telegraphic message determiner 123).

In the reception-side processor 125, the telegraphic message determiner 123 determines whether or not, among the plurality of received telegraphic messages, the telegraphic message received later is the same telegraphic message as the telegraphic message received previously (Step S202). The reception-side processor 125 temporarily stores the identification information of the previously received telegraphic message in the memory storage 126. By determining whether or not the temporarily stored identification information of the previously received telegraphic message is the same as the identification information of the later received telegraphic message which is received newly, the telegraphic message determiner 123 determines whether or not the later received telegraphic message is the same telegraphic message as the previously received telegraphic message. Since whether or not the telegraphic messages are the same is determined using the identification information, which is of an information amount smaller than that of the entire telegraphic messages, the determination can be performed fast and the amount of information stored in the memory storage 126 can be made small. On the basis of the identification information assigned to the telegraphic messages, the telegraphic message determiner 123 determines the telegraphic messages as being the same telegraphic messages if the identification information of the previously received telegraphic message is the same as the identification information of the later received telegraphic message, and determines the telegraphic messages as being different telegraphic messages (not the same telegraphic messages) if the identification information of the previously received telegraphic message differs from the identification information of the later received telegraphic message. The telegraphic message determiner 123 may determine whether or not the received telegraphic messages are the same telegraphic messages by checking the content of the previously received telegraphic message against the content of the later received telegraphic message, instead of using the identification information.

The telegraphic message determiner 123 generates data which shows the result of the determination as to whether or not the telegraphic message received later is the same as the telegraphic message received previously. The reception-side processor 125 transmits to the statistics logger 124 data indicating whether the telegraphic messages received from the receiver 121 are telegraphic messages received via both of the first communication line 1A and the second communication line 1B or are telegraphic messages received only via either one of the first communication line 1A and the second communication line 1B.

The statistics logger 124, on the data transmitted from the reception-side processor 125, stores, in a memory storage not shown in the drawings, information related to the usage status of the two lines, the first communication line 1A and the second communication line 1B, and the usage status of the one line, the first communication line 1A or the second communication line 1B. The statistics logger 124 may periodically transmit statistical information to the controller C, for example.

The reception-side processor 125 receives a telegraphic message received by the receiver 121 and processes the telegraphic message as a valid telegraphic message (Step S203) if the telegraphic message determiner 123 has determined the telegraphic message as being not the same as the previously received telegraphic message (Step S202: NO). If identification information is not stored in the memory storage 126, Step S202 need not be performed. In such an example, the telegraphic message received by the receiver 121 is processed as a valid telegraphic message by the reception-side processor 125 without being determined by the telegraphic message determiner 123 (Step S203).

If the telegraphic message has been determined as being the same as the previously received telegraphic message on the basis of the determination result of the telegraphic message determiner 123 (Step S202: YES), the reception-side processor 125 ignores the same telegraphic message received later as an invalid telegraphic message (processes the telegraphic message as not a valid telegraphic message) (Step S204). In Step S204, the reception-side processor 125 may immediately discard the telegraphic message without processing it as a valid telegraphic message or may store the telegraphic message in the memory storage 126. When storing an invalid telegraphic message in the memory storage 126, the reception-side processor 125 may discard it after a certain period of time has elapsed. The reception-side processor 125 may temporarily store the invalid telegraphic message in a memory storage or the like for the purpose of using it as backup data of the preceding telegraphic message, or for the purpose of using it as reference data for the preceding telegraphic message. In Step S203, the reception-side processor 125 is processing the previously received telegraphic message. That is to say, the reception-side processor 125 is performing the processing of Step S203 and Step S204 while processing the previously received telegraphic message.

Figure 10:
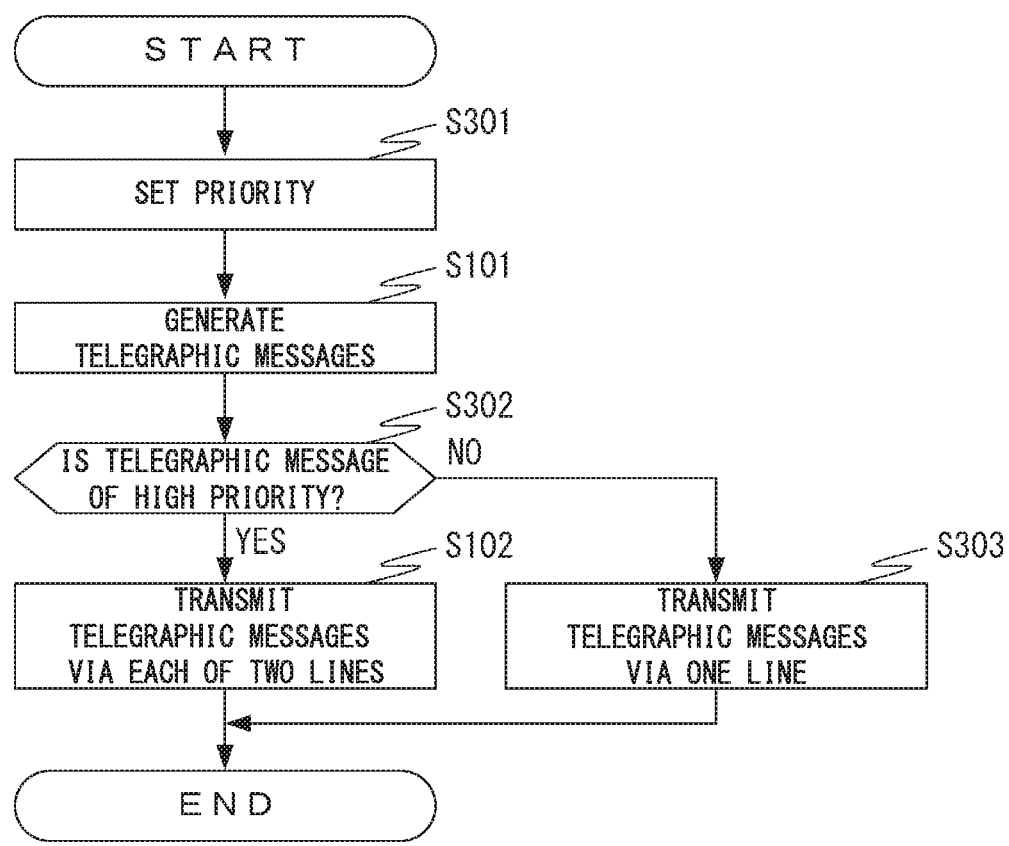
FIG. 10 is a flowchart showing another example of the operation of the transmission-side processing device.

FIG. 10 is a diagram showing another example of the operation flow of the transmission-side processing device 110. In this operation flow there is described an example in which the transmission-side processing device 110 transmits telegraphic messages to the reception-side processing device 120. In the description of this operation flow, the description is made on the basis of FIG. 8, and reference will be made to FIGS. 1, 2, 6, and 7 where appropriate. In FIG. 10, the same operations as those in FIG. 8 are assigned with the same symbols and the descriptions thereof are omitted or simplified.

As shown in FIG. 10, in the transmission-side processing device 110, the priority setter 114 sets the priority of a telegraphic message (Step S301). As described above, the priority setter 114 automatically sets the priority of telegraphic messages according to the preliminarily set contents thereof so that the priority setter 114 sets, among telegraphic messages, instructions such as a transport instruction and a traveling instruction as high-priority telegraphic messages, and sets congestion information and log information as low-priority telegraphic messages. Instead of automatically setting the priority by the priority setter 114, the operator may set the priority by an input device (such as a keyboard and a touch panel) not shown in the drawings. The priority set by the priority setter 114 is stored in the memory storage 126 in the state, for example, where the priority (high priority or low priority) is associated with identification information assigned to the header of the telegraphic message. As shown in FIG. 6, the priority setter 114 transmits the set priority to the priority determiner 112.

Next, the transmission-side processor 113 generates a telegraphic message to be transmitted to the transport vehicle V (including a specific telegraphic message) (Step S101). As shown in FIG. 6, the transmission-side processor 113 causes the priority determiner 112 to determine the priority of the generated telegraphic message. The priority determiner 112 determines the priority of the telegraphic message generated by the transmission-side processor 113 (Step S302). As shown in FIG. 6, the priority determiner 112 receives information set by the priority setter 114 or reads information related to the priority stored in the memory storage 126. If the telegraphic message generated by the transmission-side processor 113 is a specific telegraphic message (if the telegraphic message is a high-priority telegraphic message), the priority determiner 112 determines that the priority thereof is high, if the telegraphic message is not a specific telegraphic message (if the telegraphic message is a low-priority telegraphic message), the priority determiner 112 determines that the priority thereof is low. At this time, the priority determiner 112 may determine the priority from the identification information assigned to the telegraphic message.

The priority determiner 112 is not limited to the configuration in which telegraphic messages are categorized into two types of priority, a high priority and a low priority, and the priority determiner 112 may categorize telegraphic messages into three or more types of priority. The priority determiner 112 generates data indicating the determined priority. According to the determination result of the priority determiner 112, upon instruction from the transmission-side processor 113, the transmitter 113 concurrently transmits same telegraphic messages via two lines, the first communication line 1A and the second communication line 1B, respectively, or transmits a telegraphic message only via one of the first communication line 1A and the second communication line 1B.

If the priority of the telegraphic message is high (Step S302: YES), the transmission-side processor 113 instructs the transmitter 111 to concurrently transmit the same telegraphic messages via each of the two lines, the first communication line 1A and the second communication line 1B (Step S102). If the priority of the telegraphic message is low (Step S302: NO), the transmission-side processor 113 instructs the transmitter 111 to transmit the telegraphic message only via one of the first communication line 1A and the second communication line 1B (for example, only via the first communication line 1A) (Step S303).

Figure 11:
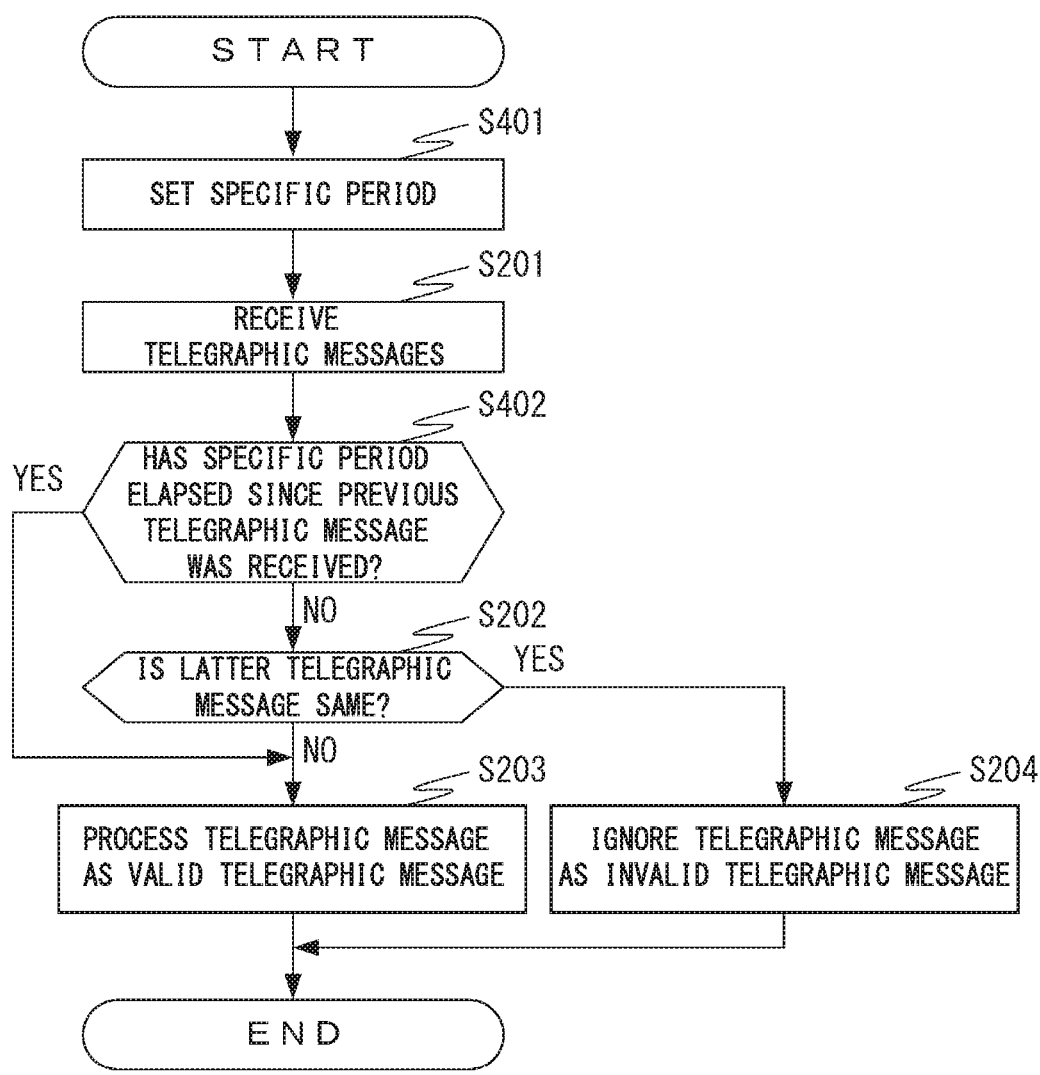
FIG. 11 is a flowchart showing another example of the operation of the reception-side processing device.

FIG. 11 is a diagram showing another example of the operation flow of the reception-side processing device 120. In this operation flow there is described an example in which the reception-side processing device 120 receives telegraphic messages (specific telegraphic messages) transmitted from the transmitter 111. In the description of this operation flow, the description is made on the basis of FIG. 9, and reference will be made to FIGS. 1, 2, 6, and 7 where appropriate. In FIG. 11, the same operations as those in FIG. 9 are assigned with the same symbols and the descriptions thereof are omitted or simplified.

In the reception-side processing device 120, the period setter 122 sets a period during which it is determined whether or not the telegraphic messages are the same telegraphic messages (Step S401). The operator sets the period on the period setter 122 using an input device not shown in the drawings. The period set by the period setter 122 is a specific period. The period setter 122 stores the set specific period in the memory storage 126. As shown in FIG. 7, the period setter 122 transmits the set specific period to the reception-side processor 125 (the telegraphic message determiner 123).

The receiver 121 of the reception-side processing device 120 receives the telegraphic messages transmitted from the transmission-side processing device 110 (Step S201). The receiver 121 transmits the received telegraphic messages to the reception-side processor 125. Upon receiving a telegraphic message, the reception-side processor 125 determines whether or not the specific period has elapsed since the previous (immediately preceding) telegraphic message was received (Step S402). For example, upon receiving a telegraphic message, the reception-side processor 125 starts timing by a timer and makes reference to the value of the timer at the time of receiving the telegraphic message received later to thereby determine whether or not it is still within the specific period. The specific period is set, for example, according to a reception timing deviation assumed when the transmitter 111 transmits telegraphic messages simultaneously or almost simultaneously via the first communication line 1A and the second communication line 1B.

Therefore, when the latter telegraphic message is received within the specific period, it is estimated that the preceding telegraphic message and the latter telegraphic message are highly likely to be the same telegraphic messages transmitted by the transmitter 111. On the other hand, when a telegraphic message is received after the specific period has elapsed, it is estimated that the telegraphic message is highly likely to be a telegraphic message of a content different from that of the previously received telegraphic message. The reception-side processor 125 outputs the value of the timer for the previously received telegraphic message every time a telegraphic message is received, resets the output timer value, starts timing by the timer from the moment of receiving the latter telegraphic message, and repeats this operation.

If the later received telegraphic message is determined as being received after the specific period has elapsed (Step S402: YES), the reception-side processor 125 processes the later received telegraphic message as a valid telegraphic message, which differs from the previously received telegraphic message (Step S203). For example, the reception-side processor 125 may temporarily store the previously received telegraphic message in a memory storage not shown in the drawings and delete the previously received telegraphic message from the memory storage when the specific period has elapsed.

If the later received telegraphic message is determined as being received within the specific period, the reception-side processor 125 instructs the telegraphic message determiner 123 to determine whether or not the previously received telegraphic message and the later received telegraphic message are the same telegraphic messages (Step S202). Upon instruction of the reception-side processor 125, the telegraphic message determiner 123 determines whether or not the telegraphic message received later is the same as the telegraphic message received previously, and generates data indicating the determination result. If the data indicating the determination result produced by the telegraphic message determiner 123 is not received for example, that is to say, if the telegraphic message is received after the specific period has elapsed since the preceding telegraphic message was received (Step S402: YES), the reception-side processor 125 processes the telegraphic message as a valid telegraphic message (Step S203).

As with the flowchart shown in FIG. 9, if the telegraphic message has been determined as being not the same as the previously received telegraphic message on the basis of the data indicating the determination result of the telegraphic message determiner 123 (Step S202: NO), the reception-side processor 125 processes the telegraphic message as a valid telegraphic message (Step S203). If the telegraphic message has been determined as being the same as the previously received telegraphic message on the basis of the data indicating the determination result of the telegraphic message determiner 123 (Step S202: YES), the reception-side processor 125 ignores the telegraphic message as an invalid telegraphic message (processes the telegraphic message as not a valid telegraphic message) (Step S204).

In Step S301 of FIG. 10 described above, when the telegraphic message generated by the transmission-side processor 113 is a specific telegraphic message containing an instruction for causing the transport vehicle V to execute a predetermined operation, it is determined that the priority is high in Step S302, and the specific telegraphic message is transmitted via both of the first communication line 1A and the second communication line 1B in Step S102. Even if a communication anomaly occurs in either one of the first communication line 1A and the second communication line 1B, the receiver 121 can still receive the specific telegraphic message via the other one of the first communication line 1A and the second communication line 1B. As a result, the reception-side processing device 120 can receive the telegraphic message with a high priority (high importance or high urgency) without delay and can execute the operation of the transport vehicle V without delay.

As with the flowchart shown in FIG. 9, since the reception-side processor 125 processes the latter telegraphic message, which is the same telegraphic message as the preceding telegraphic message, as an invalid telegraphic message in Step S204, it is possible to prevent the redundant operation from being executed on the transport vehicle V by the same telegraphic messages.

As described above, according to the communication system 100 and the communication method of this example, even if a communication anomaly occurs in either one of the first communication line 1A and the second communication line 1B, the reception-side processing device 120 can still receive the telegraphic message without delay via the other one of the communication lines. In particular, in the transport system SYS shown in FIG. 3 in which the reception-side processing device 120 is provided in the transport vehicle V, communication anomalies are likely to occur as the transport vehicle V moves, for example, where the transport vehicle V happens to be positioned behind a part of the building (such as a pillar) or behind an equipment in the building. Therefore, delays in the operation of the transport vehicle V can be prevented by applying the communication system 100 and the communication method of this example.

Furthermore, even when the same messages (specific messages) are received via both of the first communication line 1A and the second communication line 1B, the reception-side processing device 120 processes the telegraphic message received later as an invalid telegraphic message, and therefore, it is possible to avoid the redundant operation from being executed on the transport vehicle V.

Moreover, when the priority determiner 112 determines that the priority is high, the transmission-side processing device 110 transmits the same telegraphic messages (specific telegraphic messages) via both of the first communication line 1A and the second communication line 1B, and therefore, it is possible to suppress the load imposed on the first communication line 1A and the second communication line 1B and suppress the processing load in the reception-side processing device 120 from increasing.

The transmitter 111, the priority determiner 112, the transmission-side processor 113, and the priority setter 114 of the transmission-side processing device 110 may be realized as a specific means in which software and hardware cooperate, by reading a program into a computer. Similarly, the receiver 121, the period setter 122, the telegraphic message determiner 123, the statistics logger 124, and the reception-side processor 125 of the reception-side processing device 120 may also be realized as a specific means in which software and hardware cooperate, by reading a program into a computer.

The example has been described above. However, the technical scope of this disclosure is not limited to the description of the above example. It is also apparent to those skilled in the art that various modifications or improvements can be made to the above example. The technical scope of this disclosure also encompasses one or more of such modifications or improvements. The system and method defined in the appended claims are not limited to the above example, and not all combinations of features described in the example are essential to the system and method.

In the example described above, communication is performed using the two lines, the first communication lines 1A and the second communication line 1B. However, this disclosure is not limited to this configuration, and communication may be performed using three or more communication lines. In such an example, the transmission-side processing device 110 may concurrently transmit the same telegraphic messages via each of all three or more communication lines or may concurrently transmit the same telegraphic messages via part of the three or more communication lines (via two lines, for example).

In the above example, the reception-side processing device 120 is provided in the transport vehicle V, however, it is not limited to this configuration. For example, the transmission-side processing device 110 may be provided in the transport vehicle V, or the transmission-side processing device 110 and the reception-side processing device 120 may be provided in different transport vehicles V. In the above example, the reception-side processing device 120 is provided in the transport vehicle V transporting the article, however, it is not limited to this configuration. For example, at least one of the transmission-side processing device 110 and the reception-side processing device 120 may be provided in a moving body not transporting the article, or both of the processing devices may be provided in a stationary computer or the like rather than being provided in a moving body.

In the above example, the telegraphic message determiner 123 of the reception-side processing device 120 determines whether or not telegraphic messages are the same telegraphic messages, using the identification information assigned to the telegraphic messages, however, it is not limited to this configuration. For example, the telegraphic message determiner 123 may determine whether or not the telegraphic messages are the same telegraphic messages, using information other than the identification information contained in the telegraphic messages.

The order of executing operations (processes) in the system and the method in the appended claims, the specification and the drawings can be realized in an arbitrary order unless an output of the preceding process is used in the latter process. Furthermore, while operations in the above example have been described with expressions such as "first", "next", and "subsequently", the operations need not always be implemented in that order. The contents of Japanese Patent Application No. 2017-171988 and all documents cited in the detailed description of this disclosure are incorporated herein by reference.

The invention claimed is:
1. A communication system comprising:
  a transmission-side processing device, and
  a reception-side processing device,
  the transmission-side processing device and the reception-side processing device communicating using a plurality of communication lines,
  wherein the transmission-side processing device concurrently transmits the same telegraphic messages via each of the plurality of communication lines, and
  the reception-side processing device is capable of concurrently receiving telegraphic messages via each of the plurality of communication lines, and when a same telegraphic message as a previously received telegraphic message is received later, invalidates said same telegraphic message received later while processing the previously received telegraphic message,
  the transmission-side processing device includes a priority determiner which determines a priority of a telegraphic message to be transmitted and transmits the telegraphic message via the plurality of communication lines or one of the plurality of communication lines according to the priority determined by the priority determiner, the reception-side processing device is provided in a transport vehicle which transports an article, the transmission-side processing device is provided in a controller which controls the transport vehicle, and the priority determiner determines that the priority is high if the telegraphic message contains an instruction which causes the transport vehicle to execute a predetermined transport or travel operation, and determines that the priority is low if the telegraphic message does not contain the instruction.

2. The communication system according to claim 1, wherein at least one of the transmission-side processing device and the reception-side processing device is provided on a moving body.

3. The communication system according to claim 2, wherein the transmission-side processing device transmits one telegraphic message having identification information assigned thereto concurrently via each of the plurality of communication lines, and the reception-side processing device identifies whether or not the later received telegraphic message is the same as the previously received telegraphic message, based on the identification information of the plurality of telegraphic messages received via each of the plurality of communication lines.

4. The communication system according to claim 2, wherein, when, among a plurality of telegraphic messages received within a preliminarily set specific period, a same telegraphic message as a previously received telegraphic message is received later, the reception-side processing device invalidates said same telegraphic message received later.

5. The communication system according to claim 2, wherein the transmission-side processing device includes a priority determiner which determines the priority of the telegraphic message to be transmitted and transmits the telegraphic message via the plurality of communication lines or one of the plurality of communication lines according to the priority determined by the priority determiner.

6. The communication system according to claim 1, wherein the transmission-side processing device transmits one telegraphic message having identification information assigned thereto concurrently via each of the plurality of communication lines, and the reception-side processing device identifies whether or not the later received telegraphic message is the same as the previously received telegraphic message, based on the identification information of the plurality of telegraphic messages received via each of the plurality of communication lines.

7. The communication system according to claim 6, wherein, when, among a plurality of telegraphic messages received within a preliminarily set specific period, a same telegraphic message as a previously received telegraphic message is received later, the reception-side processing device invalidates said same telegraphic message received later.

8. The communication system according to claim 6, wherein the transmission-side processing device includes the priority determiner which determines the priority of the telegraphic message to be transmitted and transmits the telegraphic message via the plurality of communication lines or one of the plurality of communication lines according to the priority determined by the priority determiner.

9. The communication system according to claim 1, wherein, when, among a plurality of telegraphic messages received within a preliminarily set specific period, a same telegraphic message as a previously received telegraphic message is received later, the reception-side processing device invalidates said same telegraphic message received later.

10. The communication system according to claim 9, wherein the transmission-side processing device includes the priority determiner which determines the priority of the telegraphic message to be transmitted and transmits the telegraphic message via the plurality of communication lines or one of the plurality of communication lines according to the priority determined by the priority determiner.

11. The communication system according to claim 1, wherein the transmission-side processing device concurrently transmits same telegraphic messages via each of the plurality of communication lines if the priority determiner determines that the priority is high, and transmits the telegraphic message via one of the communication lines if the priority determiner determines that the priority is low.

12. A communication method in which a transmission-side processing device and a reception-side processing device communicate using a plurality of communication lines, the communication method comprising:

causing the transmission-side processing device to concurrently transmit same telegraphic messages via each of the plurality of communication lines; and causing the reception-side processing device concurrently to receive telegraphic messages via each of the plurality of communication lines and, when a same telegraphic message as a previously received telegraphic message is received later, invalidate said same telegraphic message received later while processing the previously received telegraphic message, wherein the transmission-side processing device includes a priority determiner which determines a priority of a telegraphic message to be transmitted and transmits the telegraphic message via the plurality of communication lines or one of the plurality of communication lines according to the priority determined by the priority determiner, the reception-side processing device is provided in a transport vehicle which transports an article, the transmission-side processing device is provided in a controller which controls the transport vehicle, and the priority determiner determines that the priority is high if the telegraphic message contains an instruction which causes the transport vehicle to execute a predetermined transport or travel operation, and determines that the priority is low if the telegraphic message does not contain the instruction.

* * * * *